United States Patent Office 3,332,992
Patented July 25, 1967

3,332,992
ISOMERIZATION OF MALEIC ACID
David Brown, Greenwich, Conn., and Harry Olenberg, Bronx, N.Y., assignors to Halcon International Inc., a corporation of Delaware
No Drawing. Filed Mar. 18, 1965, Ser. No. 440,914
3 Claims. (Cl. 260—537)

This application is a continuation-in-part of U.S. application Ser. No. 150,883, filed Nov. 8, 1961, now abandoned.

This invention relates to the production of fumaric acid and particularly to a process for producing fumaric acid by the isomerization of maleic acid wherein the fumaric acid product is relatively low in fines and has a large average crystal size.

The production of fumaric acid by the isomerization of aqueous maleic acid solution is well known. Recently, an improved catalyst system has been developed which is composed of a bromine-providing compound and an oxidizing agent, hereinafter defined, which is so active that the fumaric acid precipitates at an extremely rapid rate, so rapid that the crystals are of a very small size and contain large amounts of fines. This rapid precipitation is particularly unique to the aforesaid catalyst system because of its unusual activity.

It is advantageous to obtain fumaric acid crystals of large average size and low fines content because fines cause handling, filtration and dust problems and are undesirable from the standpoint of consumer acceptance.

In accordance with the instant invention, it has been found that the isomerization process may be advantageously performed by initially bringing only a portion of the maleic acid solution to the isomerization temperature, and thereafter adding the remainder, at a controlled rate, at a temperature less than the isomerization temperature. The cooled solution is fed to the reacting mixture gradually so as to maintain the appropriate reaction temperature, thereby slowing the rate of fumaric acid formation and permitting the growth of large crystals having a low fines content.

More specifically, the process is performed by admixing the catalyst with the total aqueous maleic acid solution at a relatively low temperature, preferably between 10 and 50° C.; adding about 15 to 50% of the solution to the reaction zone wherein it is brought to a reaction temperature in the range of 70 to 110° C. to begin the isomerization; and thereafter adding the remainder of the cold maleic acid solution to the reaction zone at a controlled rate over a period equal to at least one-half the time required for the total run. Generally, the total run time, i.e., the time necessary for the reaction to come to completion, is about 15 to 120 minutes. At least the initial half of this period is consumed in feeding the cooled solution.

The aqueous maleic acid solution may contain from about 20 to 50% of maleic acid, most generally solutions containing from 30 to 45% are employed.

While it is stated that all of the aqueous maleic acid solution is initially intermixed with the isomerization catalyst at a low temperature, it is, of course, possible to intermix the catalyst with separate portions of the maleic acid. It may be particularly desirable to intermix a portion of the total maleic acid with the total catalyst requirement initially in the reactor and thereafter feed the remainder of the cold aqueous maleic acid to the reaction zone without the catalyst. Naturally, in this procedure the maleic acid solution added may have a different concentration than that initially present in the reactor. Another technique which may be advantageously employed is the formation of a catalyst solution and feeding this solution to the reactor simultaneously with the maleic acid solution.

It will be obvious to those skilled in the art that the addition of the cold maleic acid solution must not be done so rapidly as to quench the isomerization reaction or so slowly as to result in little or no cooling effect on the material undergoing reaction. By relating the rate of feed addition to the total run time and furthermore by using a substantially uniform rate of addition, the largest average crystal size and the minimization of fines may be readily achieved.

By "bromine providing compound" is meant any soluble compound which, when in contact with the oxidizing agent, forms a mono or dioxy bromo complex. Examples of the broad classes of these compounds are: inorganic bromides wherein the bromine has a valence of —1; bromine; and N-bromoamides, N-bromoimides, acyl bromides and inorganic hypobromites wherein the bromine has a valence of +1.

The specific examples of the soluble bromides include the alkali metal bromides such as lithium bromide, sodium bromide, potassium bromide, rubidium bromide, and cesium bromide; alkaline earth bromides such as beryllium bromide, magnesium bromide, calcium bromide, strontium bromide, cadmium bromide and barium bromide; Group V bromides including those of vanadium and bismuth; Group VII bromides such as manganese bromide; and Group VIII bromides such as iron, nickel and copper bromide. Additionally, hydrobromic acid and ammonium bromides as well as polybromides such as cadmium ammonium bromides, are particularly outstanding.

N-bromoamides having the formula $RCONHBr$, N-bromoimides having the formula $R(CO)_2NBr$, and organic acyl bromides having the formula $RCOBr$ are effective, wherein the R is a hydrocarbon radical such as an alkyl, aryl, alkenyl, or aralkyl group having from one to 30 carbon atoms. Examples of the acyl bromides are acetyl bromide, propionyl bromide, n-butyryl bromide, isobutyryl bromide, n-valeryl bromide, isovaleryl bromide, n-caproyl bromide, capryl bromide, stearoyl bromide, and benzoyl bromide. Illustrative of the N-bromoamides are N-bromo-acetamide, N-bromo-propionamide, N-bromo-n-butramide, N-bromo-n-valeramide, N-bromo-n-caproamide, N-bromo-benzamide. Closely analogous to the aforesaid amides are the N-bromoimides such as N-bromosuccinimide and N-bromophthaloimide. The above organic bromine compounds are effective because they readily hydrolyze when introduced into the maleic acid solution. The hydrolysis results in the formation of HBr which, as pointed out above, is an effective bromine providing compound.

The soluble inorganic hypobromites include the alkali metal and alkaline earth metal type such as sodium, potassium and calcium hypobromite. Nitrosyl bromide is still another example.

The bromide compound is used in amounts such that it is present in a concentration of about 0.001 to 10.0%, desirably, 0.01 to 5%, and preferably 0.1 to 3.0% bromine (calculated as $NH_4Br$) based on the weight of maleic acid.

The oxidizing agent employed as an oxidizing strength of at least about 1.23 volts, and is present in an amount corresponding to 0.003 to 10.0% (i.e., on a molar basis of oxidant calculated as ammonium persulfate) desirably 0.1 to 5.0% and preferably 0.5 to 2.7% based on the weight of maleic acid.

The "oxidizing agent" which may be employed include the soluble inorganic persulfates, inorganic peroxides, such as hydrogen peroxide and alkali metal peroxides, and the soluble organic peroxides and hydroperoxides. The persulfates are preferably the ammonium or alkali or alkaline earth metal salts. Sepcifically, ammonium persulfate, sodium persulfate, potassium persulfate, lithium persulfate, calcium persulfate, manganese persulfate are the most important examples. The organic peroxides include benzoyl peroxide, cyclohexanone peroxide, acetyl peroxide, lauroyl peroxide and t-butyl peroxide. The hydroperoxides include cumene hydroperoxide, t-butyl hydroperoxide, tetralin hydroperoxide, methyl ethyl ketone hydroperoxide and methylcyclohexane peroxide.

The process is carried out by subjecting an aqueous maleic acid solution to treatment with the above indicated materials. The initial maleic acid concentration of said solutions can be in the range of 10 to 70% by weight. Suitable temperatures are generally in the range of 40 to 120° C., and preferably 65 to 85° C.

COMPARATIVE EXAMPLE A

A scrubber liquor containing 37.54% maleic acid is heated to 80° C. in a flask. The flask is equipped with a thermometer, a condenser, a means for maintaining temperature constant, and a means for sparging air through the contents. When the charge has been heated to 80° C., the isomerization catalyst is introduced. The catalyst is .45% (wt.) of ammonium bromide and 2.7% of ammonium persulfate based on the maleic acid content of the liquor. After 1 minute, fumaric acid begins to precipitate. The run is continued for 30 minutes longer with the temperature ranging from 76° C. to 87° C. The reaction product is then cooled to 25° C. and the resultant fumaric acid filtered, washed, and dried. The distribution of product particle sizes is:

| Mesh size: | Percent retained |
|---|---|
| 40 | 0 |
| 60 | 9.15 |
| 70 | 9.35 |
| 80 | 8.35 |
| 100 | 13.90 |
| 200 | 42.70 |
| 325 | 10.30 |
| Fines: smaller than 325 | 6.25 |

Example 1

The above procedure is repeated, except for the following features:
(a) Initial charge: 30% of total;
(b) Temperature range: 72–85.5° C.;
(c) Feed time for adding rest of cold sodium (40° C.): 15 minutes;
(d) Total run time: 30 minutes (15 minutes beyond final feed addition).

After 30 minutes, the reaction product is cooled to 25° C. and the resultant fumaric acid filtered, washed, and dried. The product size distribution is:

| Mesh size: | Percent retained |
|---|---|
| 40 | .2 |
| 60 | 3.6 |
| 70 | 7.8 |
| 80 | 19.3 |
| 100 | 17.3 |
| 200 | 39.0 |
| 325 | 9.6 |
| Fines: smaller than 325 | 3.2 |

Example 2

The process of Example 1 is repeated except for the following changes:
(a) Temperature range: 67–87.5° C.;
(b) Total feed time: 54 minutes;
(c) Total run time: 84 minutes.

The particle size distribution is:

| Mesh size: | Percent retained |
|---|---|
| 40 | 0 |
| 60 | 6.0 |
| 70 | 20.6 |
| 80 | 33.4 |
| 100 | 17.1 |
| 200 | 12.8 |
| 325 | 6.4 |
| Fines: smaller than 325 | 2.6 |

It is evident from these results that average particle size is greatly increased with gradual or continuous feeding compared to batch techniques, and there is a twofold or more decrease in the concentration of fines. Decreasing the feed rate increases crystal size.

Example 3

The procedure of Example 1 is repeated in a stirred reaction vessel followed by an elongated reactor (tube), carried out in a continuous manner and similar results are obtained. The temperature of the reactant mixture is controlled so as to maintain the desired temperature of the reaction mixture. The reactant mixture may be precooled if desired. In addition, the reactor may be provided with external cooling. The maleic acid solution may be heated in any convenient manner. Catalyst may be added to the solution before heating, or directly to the reactant mixture, either occassionally or continuously.

Instead of tubular reactor, a series of interconnected vessels may be used as the reacton system, and the product may be removed from the last vessel in the series.

It will be understood that modifications and variations may be affected without departing from the spirit of the invention.

What is claimed is:
1. A process for decreasing the amount of fines in the catalytic isomerization of an aqueous solution of maleic acid which comprises initiating the isomerization by raising to a temperature of from 70° C. to 110° C. an initial aqueous maleic acid solution containing about 20–50% by weight maleic acid and a soluble catalyst system containing (1) from about 0.001% to 10.0% of a bromine-providing compound selected from the group consisting of soluble inorganic bromides, alkali and alkaline earth metal hypobromites, nitrosyl bromide, bromine, N-bromoamides having the formula RCONHBr, N-bromoimides having the formula R(CO)$_2$NBr and organic acyl bromides having the formula RCOBr, wherein R is a hydrocarbon radical having from 1 to 30 carbon atoms; and (2) an oxidizing agent selected from the group consisting of ammonium, alkali and alkaline earth metal persulfates, hydrogen peroxide, benzoyl peroxide, cyclohexanone peroxide, acetyl peroxide, methylcyclohexane peroxide, lauroyl peroxide, t-butyl peroxide, cumene hydroperoxide, t-butyl hydroperoxide, tetrahydronaphthalene hydroperoxide, and methyl ethyl ketone hydroperoxide, said bromine-providing compound forming an oxybromo complex when in contact with the oxidizing agent, and controlling the rate of isomerization by adding additional quantities of a 20 to 50% by weight aqueous maleic acid solution containing said catalyst system and having a temperature of not more than 50° C., the amount of the aqueous solution added being at least equal to the amount of the initial maleic acid solution, the addition of the cooled maleic acid solution taking place over a period of time equal to at least one half the total time necessary for the reaction to come to completion.

2. A process for preparing fumaric acid having reduced fines which comprises forming an aqueous solution containing from 20 to 50% by weight maleic acid and a catalyst system containing (1) from about 0.001% to 10.0% of a bromine-providing compound selected from the group consisting of soluble inorganic bromides, alkali and alkaline earth metal hypobromites, nitrosyl bromide, bromine, N-bromoamides having the formula RCONHBr, N-bromoimides having the formula R(CO)₂NBr, and organic acyl bromides having the formula RCOBr, wherein R is a hydrocarbon radical having from 1 to 30 carbon atoms; and (2) an oxidizing agent selected from the group consisting of ammonium, alkali and alkaline earth metal persulfates, hydrogen peroxide, benzoyl peroxide, cyclohexanone peroxide, acetyl peroxide, methylcyclohexane peroxide, lauroyl peroxide, t-butyl peroxide, cumene hydroperoxide, t-butyl hydroperoxide, tetrahydronaphthalene hydroperoxide, and methyl ethyl ketone hydroperoxide, said bromine-providing compound forming an oxybromo complex when in contact with the oxidizing agent, separating and raising the temperature of from about 15 to 50% of said solution to about 70° C. and 110° C. to begin the isomerization and thereafter adding the remainder of the maleic acid solution at a controlled rate over a period of time equal to at least one half the time required for the isomerization to be completed, said remainder of the maleic acid solution having a temperature of not more than 50° C.

3. A process for the production of solid fumaric acid having an increased proportion of particles retained on a 100 mesh screen and a decreased proportion of material which passes through said screen, which process comprises forming a reaction mixture of an aqueous solution containing about 20 to 50% by weight maleic acid and a soluble catalyst system containing (1) from about 0.001% to 10.0% of a bromine-providing compound selected from the group consisting of soluble inorganic bromides, alkali and alkaline earth metal hypobromites, nitrosyl bromide, bromine, N-bromoamides having the formula RCONHBr, N-bromoimides having the formula R(CO)₂NBr, and organic acyl bromides having the formula RCOBr, wherein R is a hydrocarbon radical having 1 to 30 carbon atoms; and (2) an oxidizing agent selected from the group consisting of ammonium, alkali and alkaline earth metal persulfates, hydrogen peroxide, benzoyl peroxide, cyclohexanone peroxide, acetyl peroxide, methylcyclohexane peroxide, lauroyl peroxide, t-butyl peroxide, cumene hydroperoxide, t-butyl hydroperoxide, tetrahydronaphthalene hydroperoxide, and methyl ethyl ketone hydroperoxide at a temperature in the range of 65° C. to 85° C., and maintaining said temperature within said range while adding aqueous maleic acid having a temperature of not more than 50° to said reaction mixture, the addition of said aqueous maleic acid taking place over a period of time equal to at least one half the total time necessary for the reaction to come to completion.

References Cited
UNITED STATES PATENTS

| | | | |
|---|---|---|---|
| 2,548,687 | 4/1951 | Spatz | 260—537 |
| 2,816,923 | 12/1957 | Stephenson | 260—537 |
| 2,979,445 | 4/1961 | Lavigne et al. | 260—53 |
| 3,002,017 | 9/1961 | Wearsch et al. | 260—526 |
| 3,025,321 | 3/1962 | Lindahl et al. | 260—533 |

OTHER REFERENCES

Kharasch et al., Journal of the American Chemical Society, vol. 59, page 1155 (1937).

Wachholtz, Chemical Abstracts, vol. 22, page 908, 3rd full paragraph (1928).

LORRAINE A. WEINBERGER, *Primary Examiner.*

RICHARD K. JACKSON, *Examiner.*

I. R. PELLMAN, S. B. WILLIAMS, *Assistant Examiners.*